(12) United States Patent
Mann (10) Patent No.: US 7,370,728 B1
(45) Date of Patent: May 13, 2008

(54) APPARATUS FOR A RECLINING AND RECTRACTABLE SLING SEAT FOR USE WITH A PORTABLE HUNTING TREE STAND

(76) Inventor: Jerry E. Mann, 6401 Blackhaw Dr., Reynoldsburg, OH (US) 43068

( * ) Notice: Subject to any disclaimer, the term of this patent is extended or adjusted under 35 U.S.C. 154(b) by 136 days.

(21) Appl. No.: 08/843,162

(22) Filed: Apr. 11, 1997

(51) Int. Cl.
*A01M 31/00* (2006.01)
(52) U.S. Cl. ..................................................... 182/187
(58) Field of Classification Search ............... 182/187, 182/188, 135, 136; 297/45, 452.13, 228.11, 297/228.12, 92, 93, 230.11, 440.11
See application file for complete search history.

(56) References Cited

U.S. PATENT DOCUMENTS

| | | | |
|---|---|---|---|
| 816,340 A * | 3/1906 | Knoernschild | 5/129 |
| 1,876,479 A * | 9/1932 | Weller | 297/19 |
| 2,636,275 A * | 4/1953 | Whittington | 33/413 |
| 3,165,356 A * | 1/1965 | Geier et al. | 297/216.1 |
| 3,321,780 A * | 5/1967 | Morris | 5/122 |
| 3,419,108 A * | 12/1968 | Mobbs | 182/129 |
| 4,089,560 A * | 5/1978 | de Mattos | 297/440.11 |
| 4,148,520 A * | 4/1979 | Miller | 297/16.2 |
| 4,338,691 A * | 7/1982 | Gaffney | 4/562.1 |
| 4,474,265 A * | 10/1984 | Shinkle | 182/187 |
| 4,589,522 A * | 5/1986 | Shelton | 182/187 |
| 4,667,773 A * | 5/1987 | Davis | 108/152 |
| 5,054,849 A * | 10/1991 | Hoff | 297/440.11 |
| 5,374,107 A * | 12/1994 | Schnitzler | |
| 5,659,906 A * | 8/1997 | Nickell et al. | 5/122 |
| 5,685,395 A * | 11/1997 | Nelson | 182/135 |

\* cited by examiner

*Primary Examiner*—Alvin Chin-Shue
(74) *Attorney, Agent, or Firm*—Ward & Olivo (57) ABSTRACT

A lightweight portable tree stand incorporating a detachable reclining seat which is used in an elevated position removably affixed to a tree's trunk. With the recliner tree stand installed on a tree and the user sitting in a reclined position, and upon seeing the quarry, stands, releases the seat, and then has easy access to the entire platform allowing for enhanced, mobility, safety, and visibility of the area below. In the user releasing the seat the seat swings to the tree's trunk, this along full access to an otherwise limited surface area.

11 Claims, 11 Drawing Sheets

APPARATUS FOR A RECLINING AND RECTRACTABLE SLING SEAT FOR USE WITH A PORTABLE HUNTING TREE STAND

FIELD OF THE INVENTION

Tree stands are utilized in outdoor activities for the photography, hunting, and observation of wildlife in their undisturbed natural habitats. Specifically, tree stands are small elevated platforms that have limited space, small seats and as a result are marginally safe, offer limited mobility and visibility and are relatively uncomfortable. As the purpose of a tree stand is to enable the user to view wildlife, it should also provide comfort, mobility and safety. Unfortunately, the present field of tree stands only limitedly accomplish these aspects. In turn, the present invention allows the user unprecedented mobility, visibility, comfort, and safety.

DESCRIPTION OF THE PRIOR ART

Portable tree stands having fixed seats and footrests are attached to trees in fixed elevated positions. Once attached to the tree, and in use, the tree stand becomes immovable in both location and functional positioning. Present tree stands are embodied in rigid fixed mediums. Tree stands are generally comprised of several elements that includes a seat, platform and a manner by which the platform, and attachment are attached to a tree. The seat element usually ranges in size between, for example a rather small 12"×12" to 12"×24" whereas the platform is but a little larger than the seat. Additionally, very few tree stands have backrests and the ones that do are also rigidly affixed.

When a stand location is located, the tree is ascended by using a ladder, steps, or other suitable climbing means. When in position, the user installs his platform stand at the desired elevation. Then once the platform stand is in position, the user attaches the frame member to the tree using a flexible belt or other suitable material means, with the belt adjusted and drawn tight around the tree, the frame is then capable of supporting the user. When the tree stand is placed into position on a vertical tree the user must then climb onto the platform. Because there is such a limited amount of platform space available this can become a treacherous activity. Once on the tree stand, the user has all of but several inches upon which to "jockey" into the correct seated position. Now when positioned in a tree, the user must remain seated on a small seat and has a limited area upon which to place additional gear and bodily extremities. As a result of being seated without much room to maneuver the user has minimal access to the platform and thus substantially decreasing visibility. Additionally, the user will tend to become uncomfortable and fatigued after being confined to a small platform and seat for an extended period of time.

On certain days, a hunter may wish to remain in his elevated stand for long periods of time, often from dawn until well after dark. Remaining in a semi-restrained elevated stand for long periods is boring, uncomfortable, and very fatiguing. Resulting in, the user tending to move around in the seat making noise that may alert game to his presence.

Of even greater concern is the potentially dangerous situation that arises when a user is in the tree stand becomes fatigued or attempts to view wildlife because of the height and awkward position in which the user is placed while in the tree stand. Being elevated upwards of 15-20 feet, and having a very limited area upon which to balance, there is substantial risk of personal injury to the user as the user attempts to get into positions to view and observe quarry.

The prior art has not fully addressed the problems surrounding the limited access to the platform while the user is standing. Additionally, the prior art has not fully addressed the problems of fatigue that directly result from the user being uncomfortable in a restricted seated position with limited visibility.

An aspect of prior art that further unaddressed is the limitation of such stands being of such a design and nature that the user must select only the most vertical of trees. As the presently available tree stands have affixed seats that are limitedly adjustable, aside from vertical height adjustments, any angulated tree will result in the user being angulated either forward or backward while seated. This is extremely dangerous as any weight shift by the user will jeopardize the user's safety some 15+ feet up in the tree. Furthermore, any such pitch and resulting compensation will further decrease the pleasure, comfort and visibility from the tree stand.

An additional limitation on a majority of the presently available tree stands is in the tree stands' containing rigidly affixed back rests. Thus, such back rests suffer from the same drawbacks as the seat and even further restrict movement and visibility.

The prior art platform seats, while marginally adequate, hamper the overall effectiveness of the device. As the platforms are small and offer limited space for the user to move about and store gear the full potential of the tree stand can never be achieved. Thus, all the prior art teachings fail to teach an apparatus that effectively offers safety, maximum mobility, visibility, and comfort.

SUMMARY OF THE INVENTION

The present invention is directed at and utilized in outdoor activities such as photography, observation and hunting of animals in the wild. Moreover, the present invention modifies and vastly improves upon the prior art that are no more than small elevated platforms offering limited visibility, mobility, safety and comfort and thus allows the user to take advantage of all of the available space.

The present invention is comprised of a platform stand, a frame that encompass safety rails, and a seat and methods of seat attachment to said platform and safety rails.

Specifically, this invention deals with an elevated tree stand comprised of a seat support structure. Particularly, the seat is detachable, therein allowing for complete retraction and thus the user's complete access to the entire platform. This enhanced access permits the user to gain unprecedented maneuverability resulting in enhanced comfort, safety and viewing opportunities of the subject. The user may attach the seat to the frame member in any number of means. Furthermore, the seat is of a nature that allows for a curved configuration capable of anatomical conformation to the seated user's back and posterior features. When the user is seated in a reclined position the stand's platform may be utilized to support the feet or the front rail, thus allowing for a more comfortable seated position. The nature of attachment in the present invention allows the user to rapidly stand and release the seat permitting full access and the maximum mobility upon a limited sized platform. Accordingly, as the seat is detached the entire platform becomes fully accessible, therein allowing the user enhanced mobility and utilization of the tree stand's platform. The ability to seat or retract the seat will permit the user to quietly alter sitting comfortably and standing.

In sum, the invention embodying the detachable seat allows the user the comfort of a seat and conforming back support with that of having full access to the entire platform of a tree stand. Accordingly, the present invention addresses all concerns regarding safety, maneuverability, comfort and visibility more fully than any of the prior art. The invention consists of a side member, top and bottom cross members which form a rectangular frame that supports a seat. The seat member is preferably fabricated from a flexible heavy synthetic material of a dark or camouflage pattern that would help to visually obscure it. The metal frame of both the recliner and the platform could also be obscured by utilizing a non-reflective flat finish. The seat has a curved configuration capable of anatomical configuration to the seated user's back posture. When seated, the user's weight exerts a downward force that maintains a compressive interface between the recliner seat, the platform portion of the stand and the tree. On each side of the seat member, beside the user's knees a rope or like support is sized to be inserted into slot retainers. The upper seat member is likewise supported in a similar manner. With the user sitting in a reclined position a foot rest is utilized to support the feet which allows for a comfortable leg and foot position. When assuming a reclined position, the hunter can quickly and quietly assume a standing position by releasing the seat at his knees and moving it slightly rearward. With the seat member released, it swings toward the rear, allowing the user complete access to the platform. When the bottom seat member is in the retracted position, the platform is accessible so that the user may stand and maneuver as desired.

In conclusion the present invention discloses novel and extremely useful method and apparatus that far exceeds the functionality of the prior art.

DETAILED DESCRIPTION OF THE PREFERRED EMBODIMENT

Figure 1:
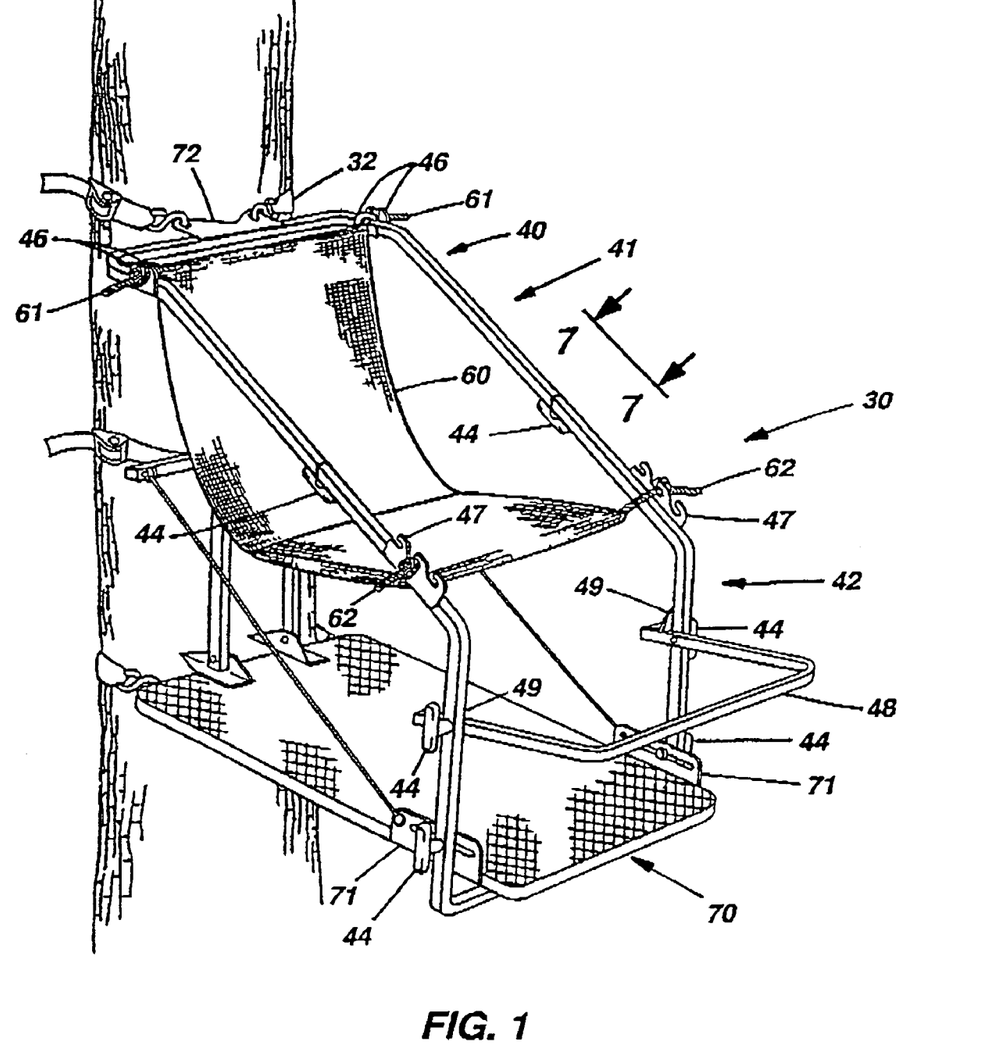
FIG. 1 is a perspective view of the portable hunting lounge/stand of the present invention with the lounge seat 60 in place.
Figure 6:
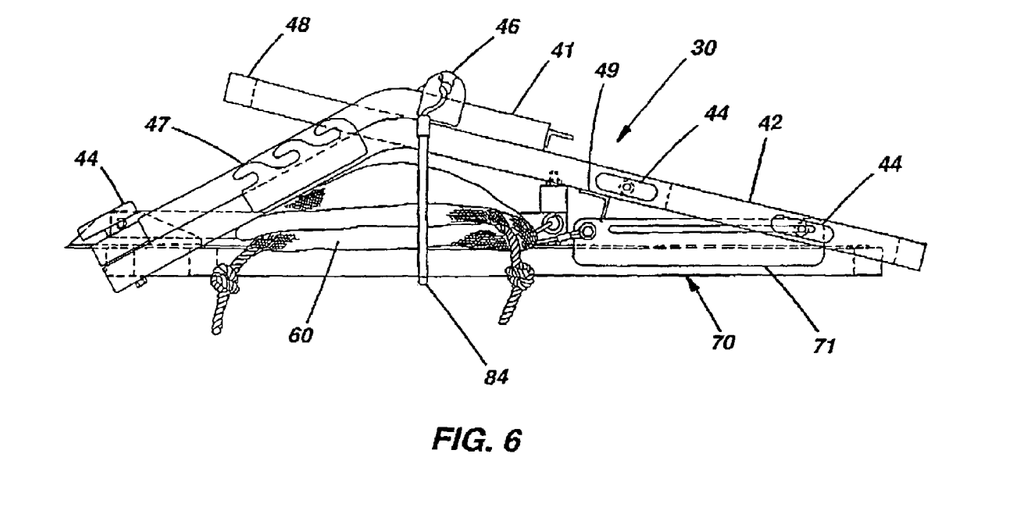
FIG. 6 is a side view of the portable hunting lounge of the present invention in a collapsed position for transporting to and form the hunting location and storage when not in use.

Referring to FIG. 1, the present invention is a recliner 30 comprised of rectangular-like frame 40 and sling-like seat 60, with said seat 60 shown in the ready-to-sit position. Recliner 30 is illustrated on a commercially available platform stand 70 that has a generally rectangular-like shape when viewed from above and is structurally designed to support an individual, and is attached to a vertical support element, such as a tree. While said platform stand 70 is typically used with a tree, it could also be used with a generally vertical pole or post as well. Rectangular frame 40 is comprised of a u-shaped-like upper support frame 41 and u-shaped-like lower support frame 42 having a similarly shaped footrest frame 48 that may be pivotally attached to the side rails. The two piece frame members 41 and 42 facilitate collapsibility for portability. However, it is understood that a one piece of said rectangular frame 40 could be used. FIG. 6 illustrates said rectangular frame 40, seat 60 and said platform stand 70 in the collapsed position for storage and transporting.

For durability and strength said upper support frame 41, lower support frame 42, and footrest frame 48 are formed of lightweight durable material with various recliner 30 elements being fabricated from similar type alloy or alloy-like material and joined to each other by weld or other comparable means of attachment. However, it is obvious to one skilled in the art that a number of alternative materials such as glass fiber reinforced resins, carbon filled reinforced composites and the like could be utilized in the fabrication of said upper and lower support frames 41, 42, and footrest frame 48. The finish for upper and lower support frames 41, 42, and footrest frame 48 it is preferably of a dark non-glare or camouflage type.

Said upper support frame 41 is configured with two vertical side rails which maybe bent slightly rearward at their upper ends, then bent at right angles to form a horizontal rail. The vertical side rails of the top section on upper support frame 41 has notched members 46 positioned to accept knots on cordage 61 of seat 60. However, it is understood that said cordage 61 could be permanently attached to the top section of upper support frame 41. Affixed to the top horizontal rail is wedge member 72 used to secure rectangular seat frame 40 to tree using a ratchet strap, tightening buckle, chain, cable or other appropriate mechanical means 32.

Figure 7:
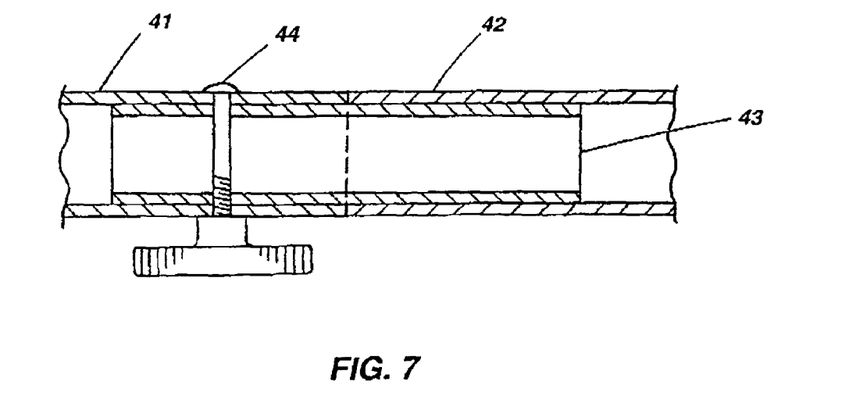
FIG. 7 is a sectional view taken along line 7-7 of FIG. 1, of an extendible support member engaged via a sliding mechanism within upper support frame 41.
Figure 8:
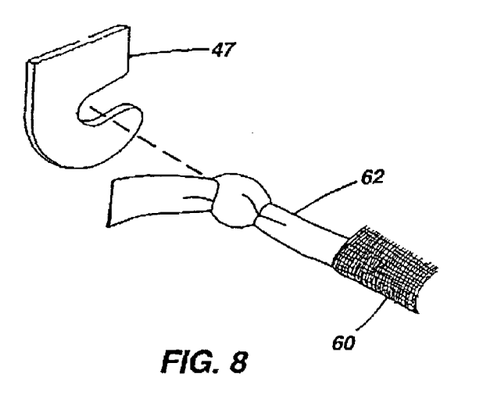
FIG. 8 is a partial perspective view showing a variant for securing the seat corners 60 to the side frame 42. A generally flat web strap 62 with a knot which is secured in a slot at the frame notched member 47.
Figure 9:
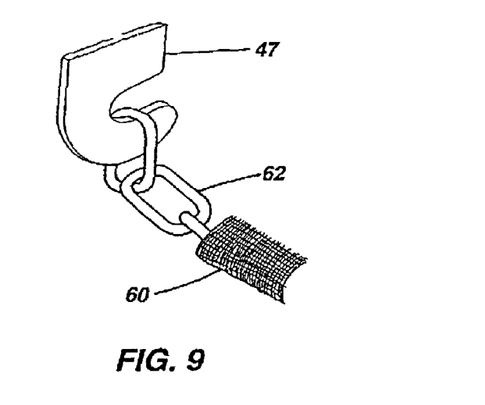
FIG. 9 is a partial perspective view showing a variant for securing the seat corners 60 to the side frame 42. A generally linked chain 62 with a link secured in a slot at the frame notched member 47.
Figure 10:
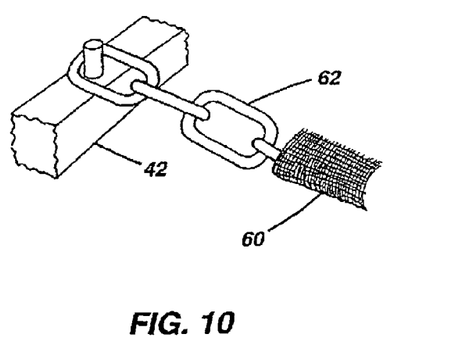
FIG. 10 is a partial perspective view showing a variant for securing the seat corners 60 to the side frame 42. A generally linked chain 62 with a link secured over a post at the side frame 42.
Figure 11:
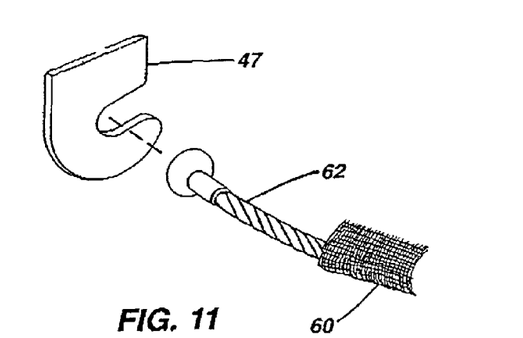
FIG. 11 is a partial perspective view showing a variant for securing the seat corners 60 to the side frame 42. A general wire rope 62 with a shank ball end fitting secured in a slot at the frame notched member 47.
Figure 12:
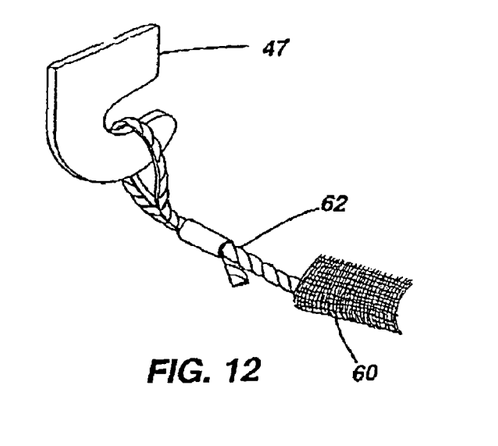
FIG. 12 is a partial perspective view showing a variant for securing the seat corners 60 to the side frame 42. A general wire rope 62 with a thimble and compression fitting secured in a slot at the frame notched member 47.
Figure 13:
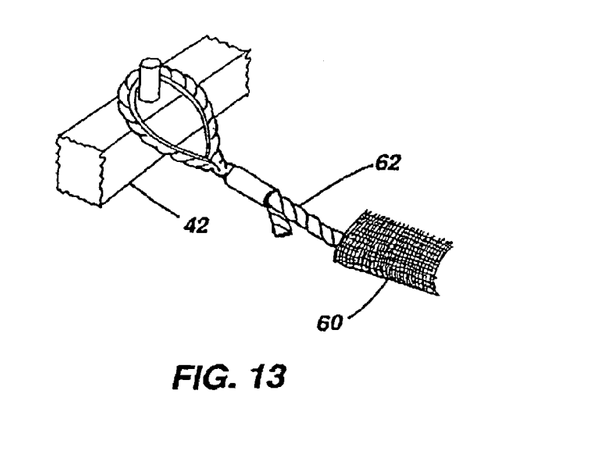
FIG. 13 is a partial perspective view showing a variant for securing the seat corners 60 to the side frame 42. A general wire rope 62 with a thimble and compression fitting secured over a post at the frame 42.
Figure 14:
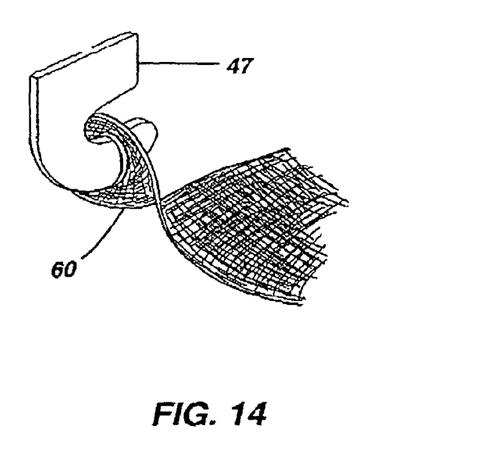
FIG. 14 is a partial perspective view showing a variant for securing the seat corners 60 to the side frame 42. A general seat 60 corner tabs with a grommet which is secured in a slot at the frame notched member 47.
Figure 15:
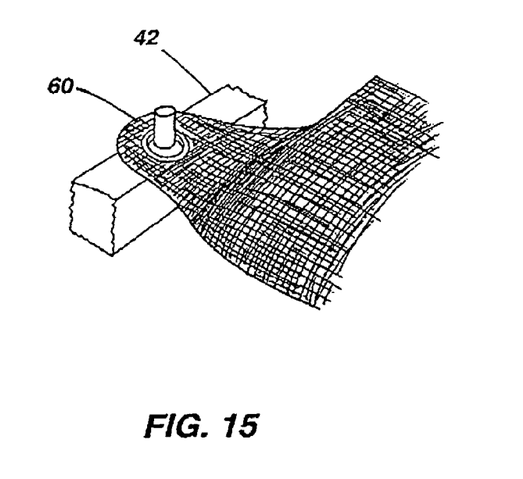
FIG. 15 is a partial perspective view showing a variant for securing the seat corners 60 to the side frame 42. A general seat 60 having corner tabs with a grommet which is secured over a post in the frame 42.
Figure 16:
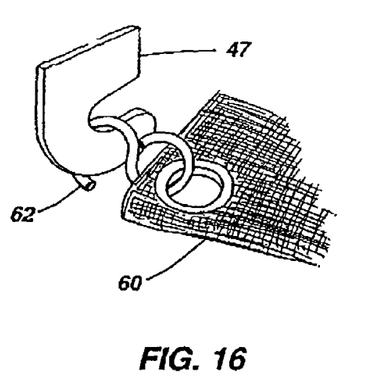
FIG. 16 is a partial perspective view showing a variant for securing the seat corners 60 to the side frame 42. A general "S" hook 85 secured in a slot at the frame notched member 47.
Figure 17:
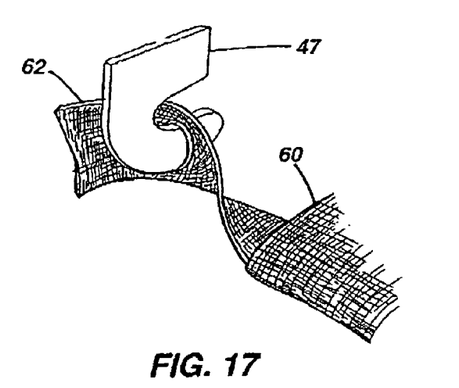
FIG. 17 is a partial perspective view showing a variant for securing the seat corners 60 to the side frame 42. A generally flat web strap 62 with a grommet which is secured in a slot at the frame notched member.
Figure 18:
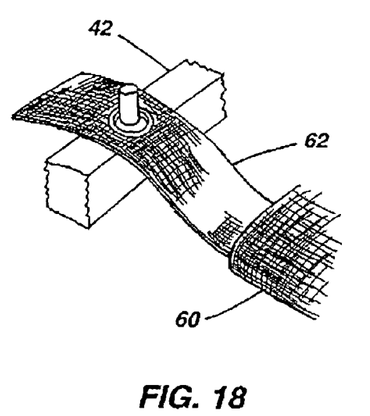
FIG. 18 is a partial perspective view showing a variant for securing the seat corners 60 to the side frame 42. A generally flat web strap 62 with a grommet which is secured over a post at the frame 42.
Figure 19:
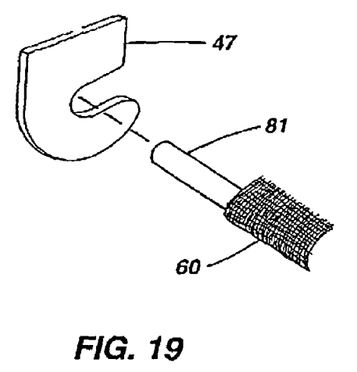
FIG. 19 is a partial perspective view showing a variant for securing the seat corners 60 to the side frame 42. A generally round rod 81 extending from seat corners 60 which are secured in a slot at the frame notched member 47.
Figure 20:
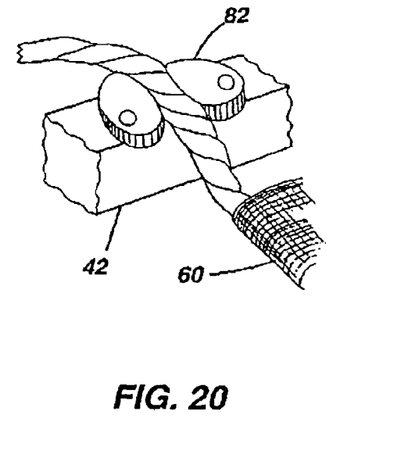
FIG. 20 is a partial perspective view showing a variant for securing the seat corners 60 to the side frame 42. A generally woven rope 62 extending from the seat corners 60 and secured in spring activated securing cam 82 at the frame 42.
Figure 21:
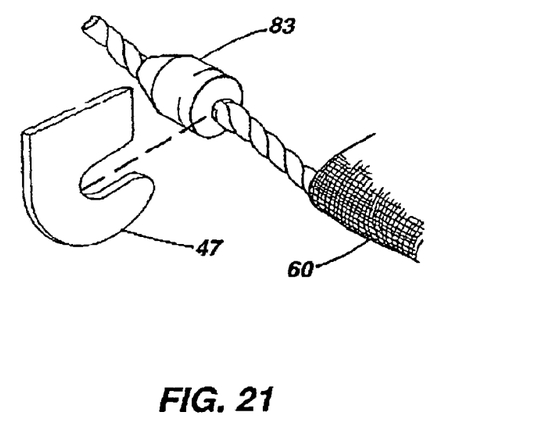
FIG. 21 is a partial perspective view showing a variant for securing the seat corners 60 to the side frame 42. A generally woven rope 62 extending from the seat corners 60 with an adjustable chuck type mechanism 83 which when tightened exerts a compressive load on rope means which is secured in a slot at the frame notched member 47.

The lower support frame 42 is configured with two vertical side rails which maybe bent slightly downward at their lower ends, then bent at right angles to form a horizontal rail at the bottom. The ends of vertical side rails of lower support frame 42 have extended support member 43 which are extended outward and engage via a sliding or sliding-like mechanism into the ends of upper support frame 41 side rails as shown in FIG. 7. Both upper support frame 41 and extended support member 43 have matching holes which maybe engaged by a threaded bolt and knob or pin 44.

Although not shown in FIG. 7, a mechanical spring activated button type device with its springs installed against the inside walls of extended support member 43 and the button device protrudes from holes in extended support member 43 the button device then protrudes into and engages the holes in the upper support frame 41 side rails. This device prevents unintentional or accidental disassembly of rectangular frame 40. The vertical side rails near the middle section of lower support frame 42, have notched members 47, which have a plurality of slots that engage the knots on cordage 62 of seat 60. The slots on notched members 47 are used for adjustment when different inclinations of seat 60 is desired. However, it is understood that a single notch in member 47 could be used as an attachment for seat 60.

The lower support frame 42 has a shaped footrest frame 48 pivotally attached to the side rails with threaded bolt and knob or pin 44. With rectangular frame 40 and seat 60 installed, footrest frame 48 is pivoted downward until it engages footrest stop 49. When said recliner 30 is collapsed for portability, footrest frame 48 is pivoted rearward until it engages footrest stop 49. FIG. 6 illustrates footrest frame 48 in the upward collapsed position for portability.

Figure 22:
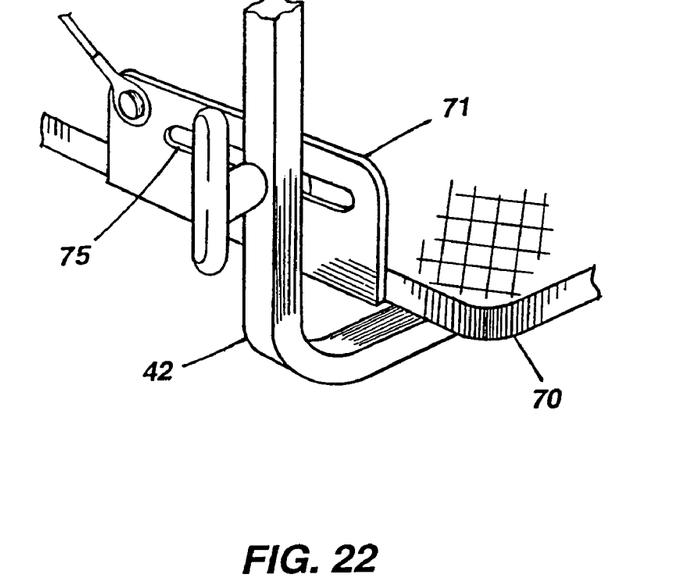
FIG. 22 is a partial prospective side view of the present invention with in-line holes of lower support frame 42 aligned with slots 75 in slot member 71 and secured with threaded bolt and nut or pin 44.

The platform stand 70 maybe a commercially available stand that is modified, or initially manufactured, to attach slotted members 71 by welding, however, mechanical fasteners could be used and different commercially available platform stands could be modified for use with the present invention. The lower support frame 42 has in-line holes located at the bottom of the side rails. These in-line holes align slots 75 in slotted members 71. FIG. 22 illustrates the in-line holes in the side rails of lower support frame 42 aligned with slot 75 in slot member 71 and secured with threaded bolt and nut on pin 44. With said recliner 30 positioned on the platform stand 70 and its top portion positioned and engaged with tree, the threaded bolts and knobs or pin 44 are tightened against slotted members 71, thus stabilizing recliner 30 on platform stand 70.

Figure 23:
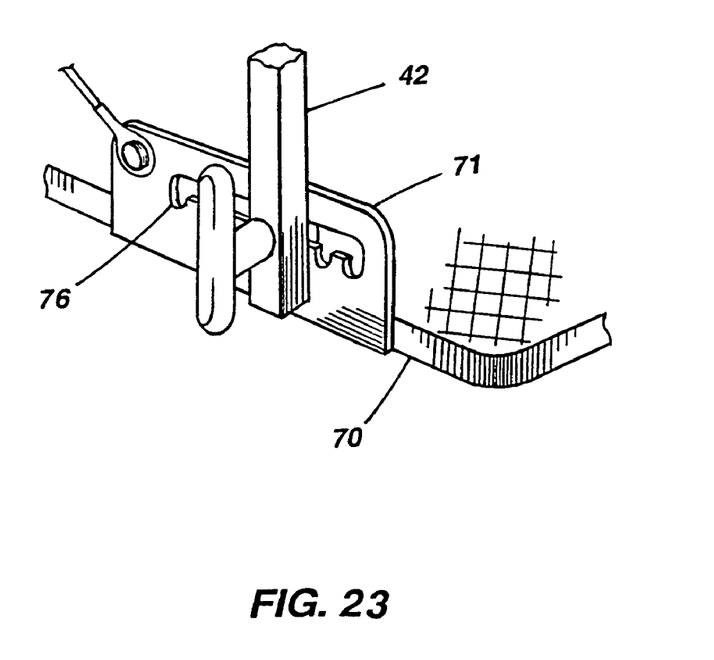
FIG. 23 is a partial prospective view of the alternate embodiment of the present invention with in-line holes of lower support member 42 aligned with notched slot 76 in slot member 71 and secured with threaded bolt and nut or pin 44.

FIG. 23 illustrates the present invention in an alternate embodiment with the vertical side rails of lower support frame 42 terminating slightly below the attachment with notched slot 76 in slot member 71. Lower support frame 42 is secured in notched slot 76 with threaded bolt and nut or pin 44.

Said seat 60 is detachable fabric seat member with a curved configuration capable of anatomical conformation to a seated user's back and posterior and is fabricated using spaced plies of fabric or plastic materials connected about the periphery and filled with stuffing material of plastic foam, kapok, or other material of the type used to fill lawn furniture cushions. However, it is understood that various types and styles of materials and means of fabrication could be used. The ends of seat 60 are encircled about a rope, cable, or other like cordage 61 and 62 with the end portion of said rope, etc. 61 and 62 being free and protruding beyond the corners and having knots secured near their mid-section. These knots are used as stops against notched members 46 and 47 on the upper and lower support frames 41 and 42. However, it is understood that various means of fabrication and methods of seat 60 attachment maybe utilized at notched members 46 and 47. These variants are illustrated in FIG. 8 through FIG. 21.

Figure 2:
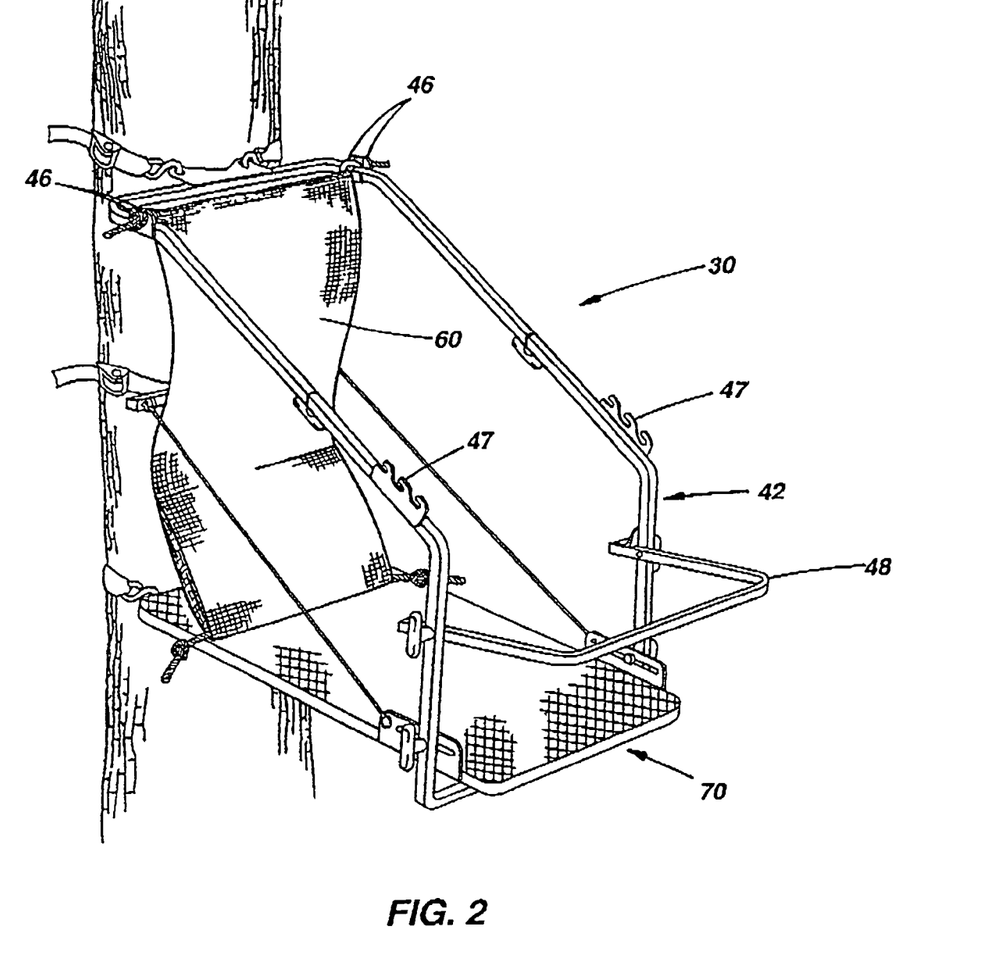
FIG. 2 is a perspective view of the portable hunting lounge/stand of the present invention with the lounge seat 60 in the rearward position.

FIG. 2 illustrates the present invention with the bottom of seat 60 released from lower notched members 47 and retracted rearward fully exposing the platform stand 70 for standing. The upper and lower seat 60 attachments at notched members 46 and 47 are not generally utilized as brace members or load bearing components of recliner 30. Therefore, installation and removal of seat 60 is simple and has no effect on the stability of said recliner 30 or platform stand 70.

Figure 3:
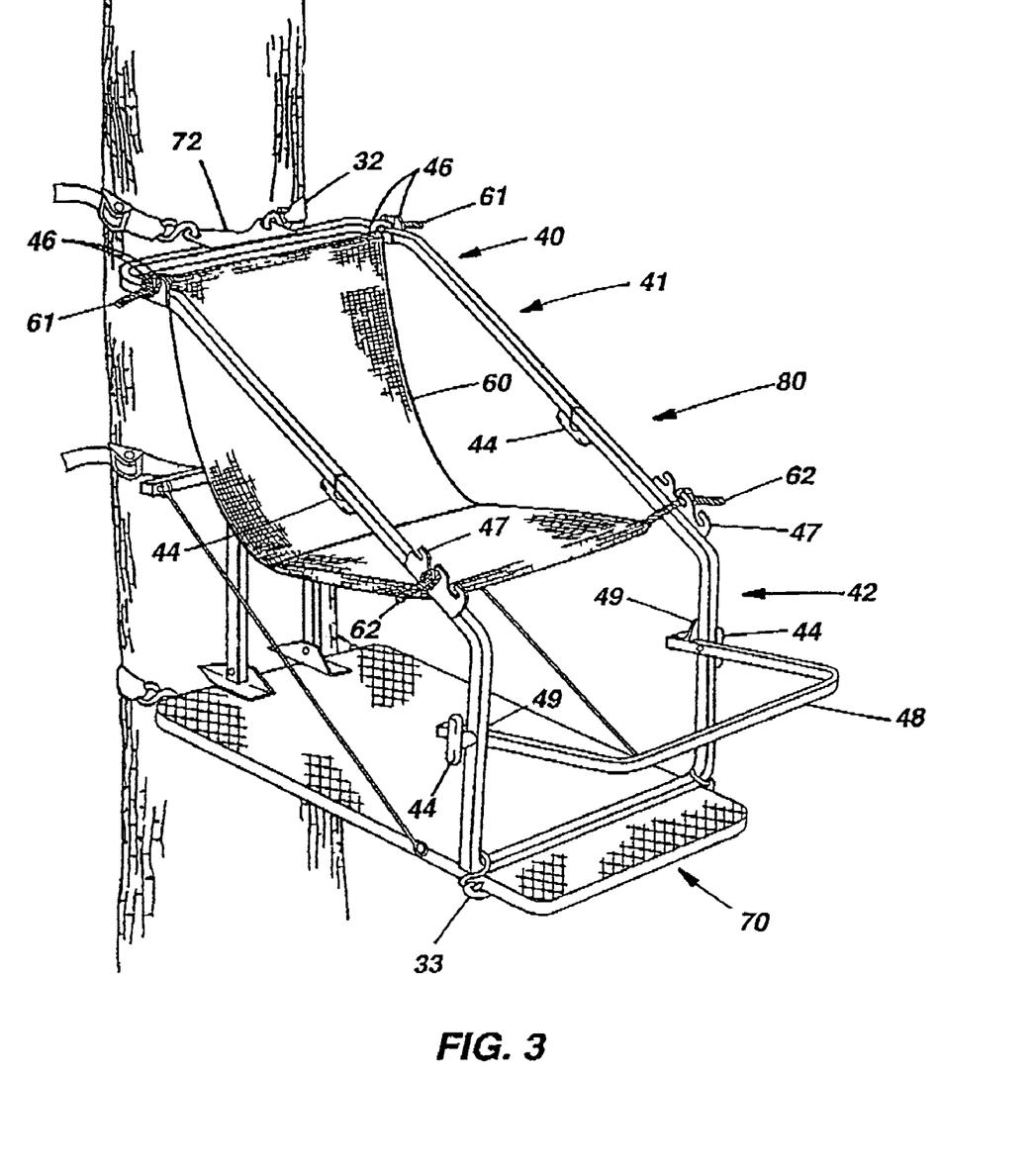
FIG. 3 is a perspective view of the alternative embodiment of the present invention with the lounge seat 60 in place.

FIG. 3 illustrates the present invention in an alternate embodiment with like numbers designating like components. Said recliner 30 is attached to tree with the bottom horizontal member of lower frame member 42 secured to the top forward most end of a commercially available platform stand 70 using a generally rubber bungee-like strap with "S" hooks, or like means, or ratchet strap, tightening buckle or other mechanical device 33.

Figure 4:
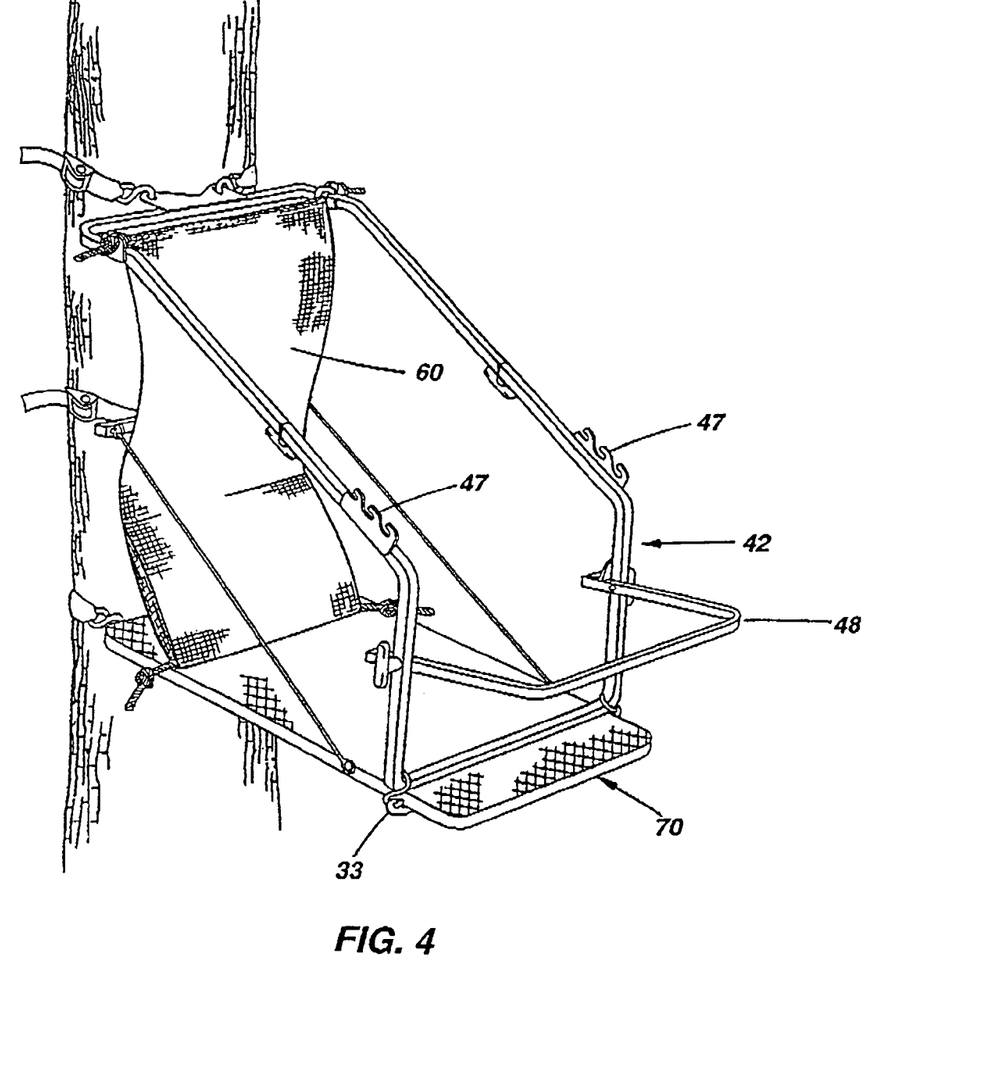
FIG. 4 is a perspective view of the alternative embodiment of the present invention with the lounge seat 60 in the rearward position.

FIG. 4 illustrates the present invention in an alternative embodiment with like numbers designating like components. Said recliner 30 is attached to tree with the bottom horizontal member of lower support frame 42 secured to the top forward end of a commercially available platform stand 70 using a generally rubber bungee-like strap with "S" hooks, or ratchet strap, tightening buckle or other mechanical device 33. Cordage 62 at the bottom corners of the seat 60 are illustrated released from lower notched members 47 and retracted rearward exposing platform stand 70 allowing access to said platform.

Figure 5:
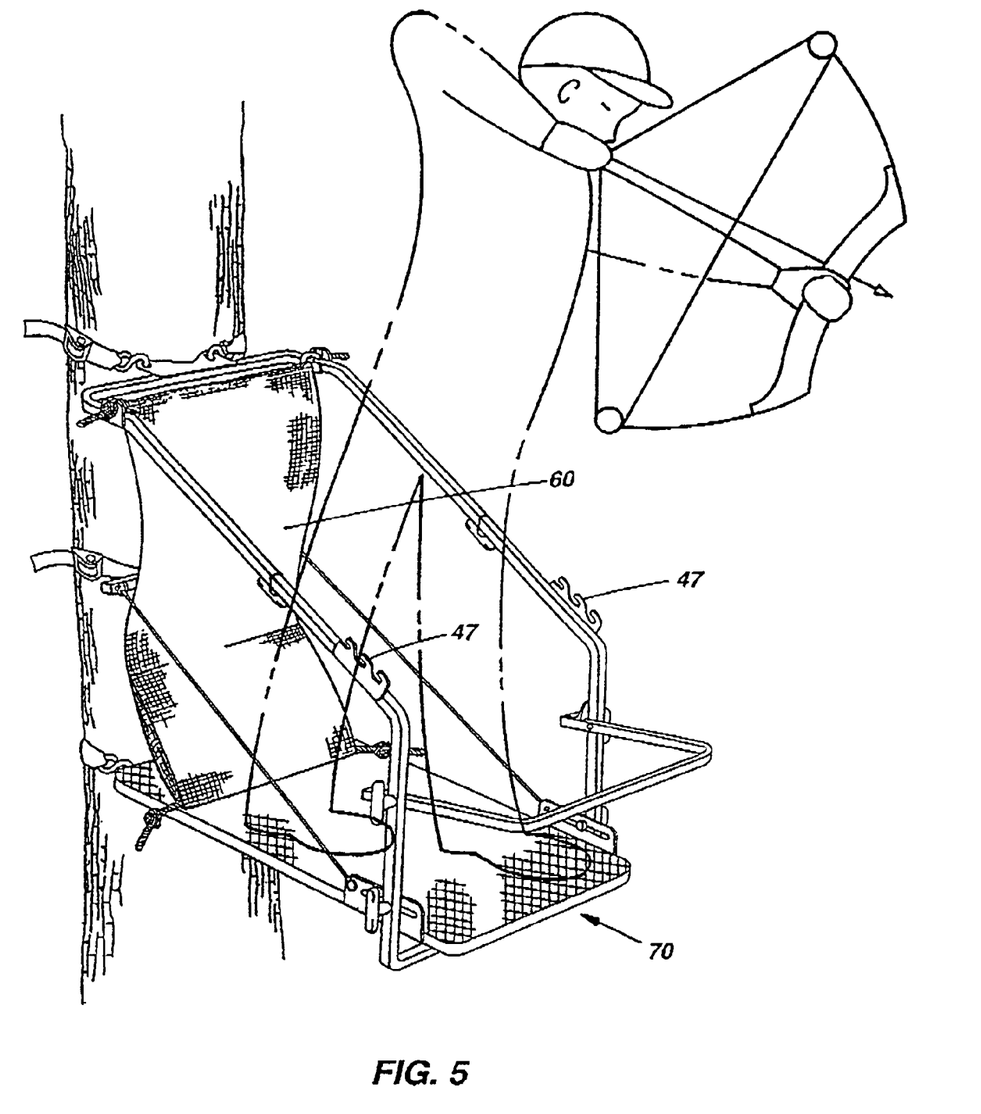
FIG. 5 is a perspective view of the portable hunting lounge of the present invention with a hunter standing in a shooting posture with the lounge seat 60 in the rearward position.

FIG. 5 illustrates the present invention with cordage 62 at the bottom corners of seat 60 released from lower notched members 47 and retracted rearward, a hunter is illustrated assuming a shooting posture on the exposed platform stand 70.

FIG. 6 illustrates a side view of the present invention and a modified. platform stand 70 in the collapsed position. The folding action is caused by removing threaded bolts and knobs or pin 44 and removing the side rails of upper support frame 41 from engaging sleeve 43, illustrated in FIG. 7. Upper support frame 41 is then rotated 180 degrees and positioned on top of lower support frame 42. Threaded bolts and knobs or pin 44 are re-installed and tightened to secure upper and lower support frames 41 and 42. The lower support frame 42 is then rotated downward until it rests against platform stand 70. The threaded bolts and knobs or pin 44 are then tightened against slotted members 71 and lower support frame 42. Footrest 48 is rotated rearward engaging footrest stops 49 and is secured by tightening threaded bolts and knobs or pin 44. Said seat 60 is stowed between lower support frame 42 and platform stand 70. A generally well known rubber bungee-like strap 84 with an attachment means is wrapped around platform stand 70 to secure the recliner stand for transportation and storage.

While I have only disclosed several embodiments of my invention, those skilled in the art will readily appreciate that there are adaptations and modifications that can be made to the present invention. Such modifications and adaptations may result in improvements to the present invention; however, such modifications will not depart from the novel inventions contained herein.

I claim:

1. A recliner seat of the type to be used in conjunction with existing tree stand support systems, said recliner seat comprising:
   a rectangular support frame including upper and lower U-shaped members, said upper U-shaped member comprising two forwardly and downwardly extending inclined side rails bent at their upper ends forming rearwardly extending horizontal portions then bent at right angles to form an upper horizontal rail interconnecting said side rails, said lower U-shaped members comprising two rearwardly and upwardly extending inclined side rails bent at their lower ends forming vertically extending portions then bent at right angles to form a bottom horizontal rail, free ends of the side rails of said upper U-shaped members are releasably connected to free ends of said lower U-shaped members to form said rectangular support frame and collapsible for ease of transport and storage;
   a substantially rectangular sling seat including flexible elements extending from its upper and lower corners; wherein said upper and lower U-shaped members connecting said recliner seat with an existing tree stand support system;
   a plurality of fittings positioned on said rearwardly extending horizontal portions and on said rearwardly and upwardly extending portions attaching said flexible elements of said sling seat, such that said sling seat is suspended from its upper and lower corners and hangs below a planar area defined by said plurality of fittings positioned on the upper and lower U-shaped members of said support frame.

2. A recliner seat according to claim 1, wherein said sling seat comprises flexible material.

3. A recliner seat according to claim 1, wherein said rectangular support frame is of a tubular type material capable of supporting the weight of a user.

4. A recliner seat according to claim 1, wherein said sling seat is positioned inside of said rectangular support frame.

5. A recliner seat according to claim 1, wherein said fittings on said lower member of said support frame each have a plurality of positions for supporting said flexible elements extending from said lower corners of said sling seat such that a plurality of seating configurations may be chosen by a user.

6. A recliner seat according to claim 5, wherein said rectangular sling seat may be detached from said lower member for standing on said existing tree stand support systems.

7. A recliner seat according to claim 1, wherein said rectangular support frame further comprises means for attaching said lower member of said support frame to said existing tree stand support system.

8. A recliner seat according to claim 1, wherein said flexible elements comprise knobs.

9. A recliner seat according to claim 8, wherein said knobs on said upper flexible elements are positioned such that said knobs engage said fittings on said upper member of said support frame, and wherein said knobs on said lower flexible elements are positioned such that said knobs engage said fittings on said lower member of said support frame.

10. A recliner seat according to claim 1, wherein said plurality of fittings on said lower member of said support frame further comprising:
    a plurality of notched members for adjustably securing the flexible elements extending from the lower corners of said sling seat, such that said sling seat can be positioned in a plurality of inclinations equal to the number of the plurality of notched members on a side of the lower member of said rectangular support frame.

11. A recliner seat according to claim 1, wherein the number of said plurality of fittings on a side of the lower member of said support frame equal a number of inclinations in which said sling seat can be positioned.

* * * * *